UNITED STATES PATENT OFFICE 2,503,855

ACID DYESTUFFS OF THE ANTHRAQUINONE SERIES AND A PROCESS FOR THEIR MANUFACTURE

Samuel von Allmen and Hans Eggenberger, Basel, Switzerland, assignors to Sandoz Limited, Basel, Switzerland No Drawing. Application October 6, 1947, Serial No. 778,260. In Switzerland October 10, 1946

8 Claims. (Cl. 260—371)

The present invention relates to new violet acid dyestuffs of the anthraquinone series, to their intermediates and to a process for the manufacture of the said dyestuffs and intermediates.

It has been found that new dyestuffs of the anthraquinone series can be prepared by condensing anthraquinone derivatives of the general formula

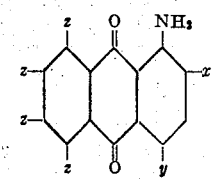

wherein $x$ stands for chlorine, bromine or a sulphonic acid group, $y$ stands for chlorine or bromine and one or two $z$'s stands for chlorine or bromine, the other $z$ being hydrogen, with an acid amide, such as acetamide, benzamide, benzene sulfamide or the toluene sulfamides. The condensation products are intermediates of the general formula

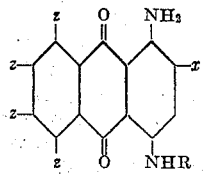

wherein $x$ stands for chlorine, bromine or a sulphonic acid group, one or two $z$'s stands for chlorine or bromine, the other $z$'s being hydrogen, R stands for an acyl radical like —COCH$_3$, —COC$_6$H$_5$, —SO$_2$C$_6$H$_5$, —SO$_2$C$_6$H$_4$CH$_3$.

These condensation products can be transformed into the corresponding amino compounds by treating the same with a saponifying agent, preferably with concentrated sulphuric acid.

In the case, where $x$ stands for chlorine or bromine, this halogen atom located in 2-position must be replaced before or after the saponification by a sulphonic acid group by means of treatment with an alkali metal sulphite.

The new dyestuffs thus obtained possess the general formula

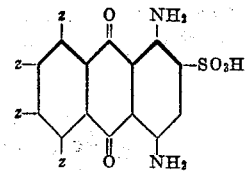

wherein one or two $z$'s stand for chlorine or bromine, the other $z$ being hydrogen.

These new dyestuffs dye wool in pure violet shades of good fastness properties. Compared to the dyestuffs obtained according to British Patent No. 8,109/1915, the new dyestuffs possess exceedingly improved fastness properties.

The following examples, without being limitative illustrated the present invention the parts being by weight. The quantities mentioned hereafter may vary in large limits.

Example 1

32 parts of the potassium salt of 1-amino-4-brom-7-chloranthraquinone-2-sulphonic acid, 18 parts of p-toluene sulfamide, 8.8 parts of sodium bicarbonate, 0.4 part of copper powder, 0.2 part of cuprous chloride and 350 parts of water are stirred for 2 hours at 70° C.

The condensation being finished, the reaction product is worked up in the usual manner and saponified by short digestion at 60-80° C. in concentrated sulphuric acid or sulphuric acid monohydrate. The 1.4-diamino-7-chloranthraquinone-2-sulphonic acid is obtained by pouring the reaction product into a mixture of water and ice; by addition of only small quantities of water to the sulphuric acid solution, the sulphate of the same acid will be obtained and then worked up. The dyestuff is soluble in concentrated sulphuric acid with a clear yellow colour which, on addition of some p-formaldehyde, becomes transformed into a blue shade. It dyes animal fibres such as wool, silk and synthetic fibres, like nylon, in violet shades of good fastness properties.

Dyestuffs of similar properties will be obtained by replacing the potassium salt of 1-amino-4-brom-7-chloranthraquinone-2-sulphonic acid by the 1-amino-4-brom- or -4-chlor-6-brom- or -6-chlor-anthraquinone-2-sulphonic acid or by the potassium salt of 1-amino-4-brom- or -4-chlor- 6.7-dichlor- or -6.7-dibrom- or -6-chlor-7-brom- or -7-chlor-6-brom anthraquinone-2-sulphonic acid or by 1-amino-2.4.7-tribrom- or -dibromchlor- or -brom-dichlor- or -trichloranthraquinone. The condensation of the trihalogen compounds is preferably carried out in an organic solvent whereupon, in order to replace the halogen atom located in 2-position by a sulphonic acid group, a treatment with alkali metal sulphite will follow.

Example 2

32 parts of the potassium salt of 1-amino-4-brom-5-chlor-anthraquinone-2-sulphonic acid are heated with stirring for 2 hours at 40-45° C. with 14.4 parts of o-toluene sulfamide, 6.4 parts of sodium bicarbonate, 0.4 part of copper powder, 0.2 part of cuprous chloride and 350 parts of water.

After completion of the condensation the reaction product is worked up in the usual manner and saponified by short digestion at 60-80° C. in concentrated sulphuric acid or sulphuric acid monohydrate. The 1.4-diamino-5-chloranthraquinone-2-sulphonic acid is obtained by pouring the reaction product into water.

The dyestuff is soluble in concentrated sulphuric acid with a clear yellow colouration, which, on addition of some p-formaldehyde, becomes transformed into a blue shade. It dyes animal fibres, such as wool, silk and synthetic fibres, like nylon, in reddish violet shades of good fastness properties.

Dyestuffs of similar properties will be obtained by replacing the potassium salt of 1-amino-4-brom-5-chlor-anthraquinone-2-sulphonic acid by the sodium salt of 1-amino-4-brom- or -4-chlor-8-brom- or -8-chlor-anthraquinone-2-sulphonic acid or by the potassium salt of 1-amino-4-brom- or -4-chlor-anthraquinone-5.8-dichlor- or -5.8-dibrom- or -chlorbrom-anthraquinone-2-sulphonic acid, its sodium salt or the free acid.

Example 3

32 parts of the potassium salt of 1-amino-4-brom-7-chlor-anthraquinone-2-sulphonic acid are heated with stirring for 2 hours at 80° C. with 13 parts of benzamide, 7.2 parts of sodium bicarbonate, 0.5 part of copper powder and 450 parts of water.

After the condensation is finished the reaction product is worked up in the usual manner and saponified by short digestion in concentrated sulphuric acid or in sulphuric acid monohydrate.

The dyestuff obtained is identical with the product obtained according to Example 1. It may also be prepared by replacing the benzamide by another acid amide such as acetamide or benzene sulfamide.

What we claim is:

1. An acid anthraquinone dyestuff of the formula

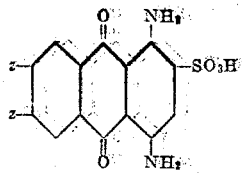

wherein at least one z stands for a substituent selected from the group consisting of chlorine and bromine, the other z being hydrogen.

2. The anthraquinone dyestuff of the formula

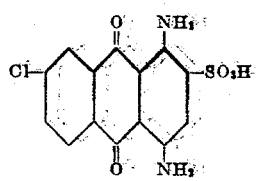

3. The anthraquinone dyestuff of the formula

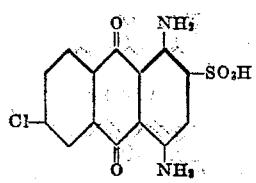

4. The anthraquinone dyestuff of the formula

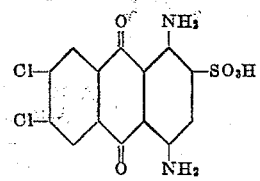

5. A process for the manufacture of a new acid dyestuff of the anthraquinone series comprising the step of heating an anthraquinone compound of the formula

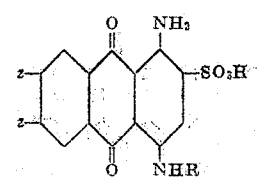

wherein at least one z stands for a substituent selected from the group consisting of chlorine and bromine, the other z being hydrogen, and R represents an acyl radical selected from the group consisting of $-COCH_3$, $-COC_6H_5$, $-SO_2.C_6H_5$, and $-SO_2.C_6H_5.CH_3$, with sulfuric acid at a temperature of 60–80° C.

6. A process for the manufacture of a new acid dyestuff of the anthraquinone series comprising the step of heating in an acid medium 1-amino-4-p-toluenesulfonamido-7-chloroanthraquinone-2-sulfonic acid with sulfuric acid at a temperature of 60–80° C.

7. A process for the manufacture of a new acid dyestuff of the anthraquinone series comprising the step of heating in an acid medium 1-amino-4-p-toluenesulfonamido-6-chloroanthraquinone-2-sulfonic acid with sulfuric acid at a temperature of 60–80° C.

8. A process for the manufacture of a new acid dyestuff of the anthraquinone series comprising the step of heating in an acid medium 1-amino-4-p-toluenesulfonamido-6,7-dichloroanthraquinone-2-sulfonic acid with sulfuric acid at a temperature of 60–80° C.

SAMUEL von ALLMEN.
HANS EGGENBERGER.

REFERENCES CITED

The following references are of record in the file of this patent:

UNITED STATES PATENTS

| Number | Name | Date |
| --- | --- | --- |
| 2,025,370 | Baumann | Dec. 24, 1935 |
| 2,135,346 | Lee et al. | Nov. 1, 1938 |
| 2,433,551 | Gutzwiller | Dec. 30, 1947 |

FOREIGN PATENTS

| Number | Country | Date |
| --- | --- | --- |
| 71,657 | Switzerland | Feb. 1, 1916 |
| 293,100 | Germany | July 17, 1916 |
| 620,908 | Germany | Oct. 30, 1935 |